May 30, 1950
L. A. GRUENWALD
2,509,494
ART OF LAMINATION
Filed Feb. 16, 1944
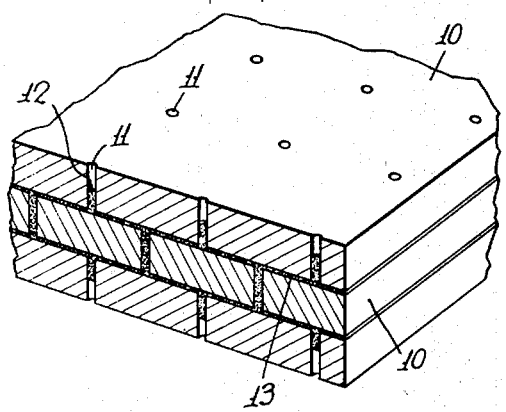
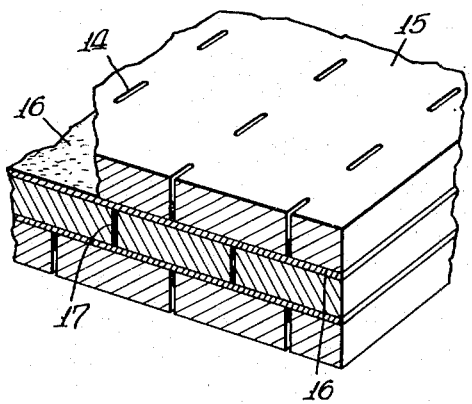
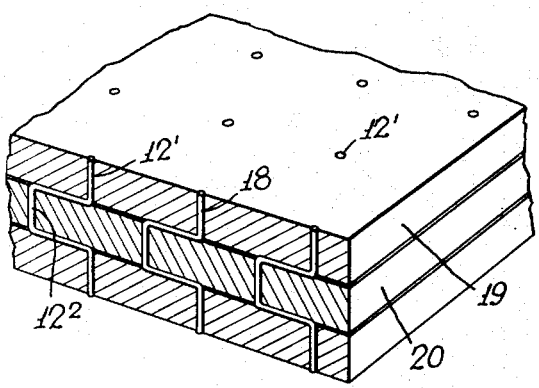
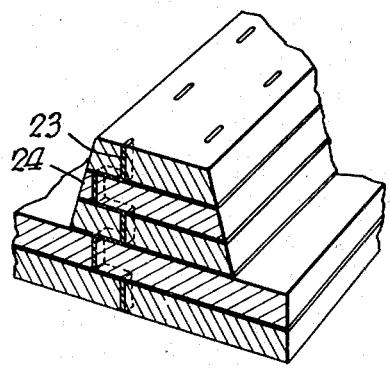
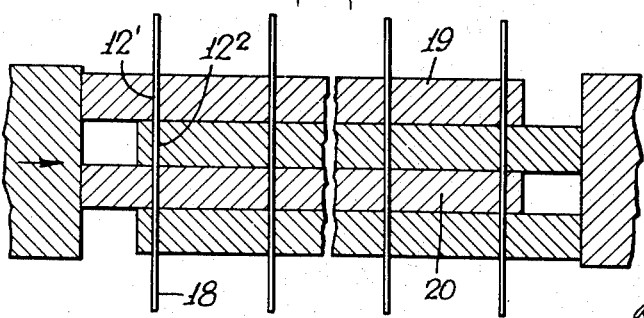
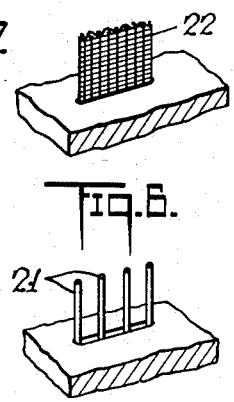
INVENTOR
Louis A. Gruenwald
BY
Dean Fairbank & Hirsch
ATTORNEYS
44-28

Patented May 30, 1950

2,509,494

UNITED STATES PATENT OFFICE 2,509,494

ART OF LAMINATION

Louis A. Gruenwald, Long Island City, N. Y.

Application February 16, 1944, Serial No. 522,538

5 Claims. (Cl. 154—119)

The present invention is concerned with laminated structures and methods for preparing the same.

It is among the objects of the invention to provide a laminated structure, the cost of which shall not be materially greater than that of ordinary laminated structures, but which shall have greatly enhanced bonding effectiveness between the constituent laminations thereof, without material loss in the flexibility of the structure as a whole.

In the accompanying drawings in which are shown one or more of various possible embodiments of the several features of the invention, Fig. 1 is a perspective view, partly in section, showing one embodiment of the invention, Fig. 2 is a view similar to Fig. 1 showing a modification, Fig. 3 is a view similar to Fig. 1 showing another embodiment, including bonding filaments, Fig. 4 is a transverse sectional view showing the method of assembling the structure of Fig. 3, Fig. 5 is a perspective view showing one special application of the invention, Fig. 6 is a detail view of a modification showing one arrangement of filaments, and Fig. 7 is a view similar to Fig. 6 showing another modification.

Referring now to the drawings, the embodiment of Fig. 1 shows a composite structure made of a series of laminations 10, each provided with small or needle perforations 11 transversely therethrough, desirably arranged in columns and rows as shown, the perforations of the successive laminations being out of registry, or staggered, as shown. Each of these perforations may be a needle hole as little as $\frac{1}{64}$ of an inch or less in diameter, readily punched by a hot needle, or, where desired, these holes may be as large as $\frac{1}{4}$ of an inch or larger in diameter.

The resin used for bonding the laminations together may be selected according to familiar practice to attain the required mechanical, electrical or chemical properties, depending upon the use to which the structure is to be placed. The resin may be of either the thermo-setting or the thermo-plastic type. The resin in either form may be interposed between the surfaces of the laminations to be bonded together, in the form of a powder or in a porous sheet impregnated therewith, or in the form of a thin flexible fabricated all-resin film.

There is on the market a thermo-setting phenol formaldehyde film furnished in rolls which may be conveniently used for the purpose. There is also on the market a film of thermoplastic resin likewise furnished in rolls, which is a co-polymer ethylene dichloride and vinyl chloride, and which serves when the structure is not subjected to substantial heat. Other types of polyvinyl compounds such as the acetate or the chloride, the butyral or the acetal may be used to advantage.

In each application, the resin may be set, hardened, condensed or polymerized by pressure and heat to bond the laminations together. The heat may be applied electronically or by radiation, or in any of the conventional manners. In this operation, the resin flows not only into the minute surface irregularities of the laminations, but penetrates through the successive laminations to fill the perforations 11.

The thermo-setting type of resin may alternatively be applied from a solution by either dipping or coating the individual laminations, whereupon the solvents are evaporated followed by the application of pressure and heat as above noted.

The completed structure thus presents not merely separate and distinct films 13 of resin between laminations, but these films are themselves directly bonded together by the resin bridges 12 filling the perforations 11 that intervene between such films, said resin bridges being themselves securely bonded to the walls of the respective perforations.

The transverse, hardened resin bridges anchor the successive laminations securely together against slippage relative to each other under bending stress applied to the structure. That stress is, therefore, uniformly distributed over the areas of the film between successive lines of resin bridges 12, so that no excessive strain will be exerted in use and the resin films between successive laminations will not be sheared or cracked by strain along the laminations.

Furthermore, the hardened plastic bridges protect the structure against rupture by strain normal to the laminations. The bridges so tightly knit, stitch, nail or clamp the contiguous laminations together that the entry of moisture therebetween in the course of setting, is substantially precluded and the consequent splitting or breaking due to expansion of trapped water vapor frequently incurred in conventional film-bonded laminated structures is avoided. By the present invention there is thus a marked advance in the security, strength and dependability of the laminated structure, to withstand strain in all directions either along the area of the bond or normal thereto. The makeshift commonly resorted to in the manufacture of laminated structures, of applying glue to the edges of laminated panels in an effort to impede the entry of humidity between the laminations is dispensed with by the present invention.

It will be understood that where the small needle holes are used these could be relatively close together at distances say of ¼ inch, so that a particularly intimate and close bond is effected between the individual laminations.

In the embodiment of Fig. 2, the perforations, instead of being needle holes are elongated slits 14 transversely of the laminations, which slits desirably are aligned in rows and columns on the individual laminations, but the slits in the successive laminations are staggered with respect to each other as shown.

Illustratively, there are shown in Fig. 2 intervening between the denser plywood sheets 15, sheets 16 of porous flexible material, which may be either impregnated with the bonding resin or have the same coated or rolled thereon. The porous sheet 16 could be of matted, woven or otherwise sheeted material such as bleached or unbleached paper, alpha-cellulose, cotton, asbestos or glass, as desired. Desirably, there is sufficient resin in the porous layers 16 so that in the process of compacting, heating, and setting the resin there will be adequate exudation from the fibrous layers, completely to fill the slits 14 in the laminations and thereby securely to bond the structure into a unit by bridges 17 of resin.

The embodiment of Fig. 3 is similar to that of Fig. 1, but includes filaments 18 of metal wire, or of fiber that have substantial tensile strength. Said filaments are threaded, as shown, transversely through the laminated structure, passing from a perforation 12' in each lamination along the surface thereof through the perforation 12² in the next lamination and being thus snaked through the structure in a zigzag formation. Of course, this wire embodiment could be used either with the type of structure in which resin alone is interposed between the laminations, as shown in Fig. 1, or with the type of structure in which the resin impregnates or coats intervening sheets 16 of porous or fibrous material such as paper or woven fabric as shown in Fig. 2. The metal reinforcement, as shown in the embodiment of Fig. 3, serves greatly to increase the tensile strength of the laminated structure and reinforces the laminations, so that the unit will admit of substantial curvature without cracking or weakening. Moreover, the filament reinforce serves more or less as a form to stiffen the structure both during hardening of the resin and in the completed structure. The action of the wire or filament is in some respects like that of steel in reinforced concrete.

In Fig. 4 is shown diagrammatically the method of assembling the structure of Fig. 3. As will be seen, the laminations are initially placed with the perforations 12' and 12² in registry. The wires or filaments 18 are threaded through the aligned perforations, as shown. Thereupon alternate laminations 19 and 20 are shifted longitudinally over the relatively stationary intervening laminations, thereby to stagger the perforations and to displace the wires or filaments into the zigzag relationship shown in Fig. 3. The stack is thereupon subjected to pressure and heat to set, harden, condense or polymerize the resin for bonding the laminations together and filling the transverse perforations 12', 12² and embedding the wire 18, all in manner above described.

Where the transversely slit laminations of Fig. 2 are to be used with a filament reinforce such as that of Fig. 3, it will be understood that a series of parallel wires 21 may be passed through the slits 14 as shown in Fig. 6, or wire mesh strips 22 may be employed, as shown in Fig. 7, or ribbon 23, as shown in Fig. 5.

Aside from the additional equipment required to perforate the laminations according to the present invention, in any of its embodiments and to introduce the filaments, mesh or ribbon where these are used, the conventional equipment and procedure for making laminated structures may be used without change in practicing the present invention, although it is desirable to use an adequate amount of resin between the laminations, completely to plug the various needle holes or perforations, to provide the resin bridges.

The invention is applicable not only to structures the laminations of which are of wood veneer, but also to structures one or more of the laminations of which are of sheet metal, molded plastic or other material, as desired or required.

The invention is also applicable to structures the laminations of which are of any flexible membrane, or sheets such as paper, "cellophane," parchment, metal foil or of any two or more of said types of sheets. Obviously, the invention lends itself to the fabrication of such laminated structures in a continuous process in which the respective sheets fed from reels are passed over hot mandrels to impart plasticity to the resin and then subjected to the required pressure and temperature for setting or polymerization in manner well understood. Ordinarily, of course, the filament bond feature shown in Figs. 3, 4 and 5, would not be used in the embodiments utilizing paper, "cellophane," parchment or metal foil, rather than wood veneer, metal or plastic sheet laminations.

Referring to Fig. 5 there is shown one special application of the invention to structures, ornamental or otherwise, that have a specialized contour involving enlargements of varying thicknesses of undeformed plywood laminations. In the generally frusto-pyramidal structure shown, the laminations of the stack are progressively narrower, the lateral edges of the successive laminations 24 being ground off to give the desired smooth contour. The transverse resin bridges across the successive laminations in their staggered relation, especially if reinforced by wire, or ribbon, so greatly enhance the security of bond of the laminations that cracking or splitting off is guarded against even under severe impact against the enlargement shown. It is understood that the pyramidal contour is merely illustratively shown and that any desired conformation of considerable irregularity may be formed from flat, undeformed plywood laminations according to the principle set forth without the necessity of rivet connectors.

It will also be understood that while the perforations are desirably applied to all of the laminations, it would be possible, within the scope of the invention, to perforate merely the core laminations, that is, those intervening between the exposed or surface laminations which could be left intact if desired. However, the perforations are so small in diameter, and the slits so narrow and are arranged on so uniform a pattern that their exposure to view would not detract from, but rather enhance, the decorative effect, but, of course, the appearance of the holes, if exposed, would ordinarily be concealed by appropriate surface coating. By way of example, prefabricated film sheets of resin, such as those above referred to, when appropriately colored or tinted could be bonded to the exposed surface of the laminated structure to afford any desired decorative effect.

It is, of course, understood that the finished, simple laminated structure may be applied to any of the uses to which laminated plywood has heretofore been applied. The structure readily lends itself to molding in any shape, even most intricate shapes, by resort, for instance, to the Vidal process of vacuum shaping to molds.

Among the many uses to which the invention may be put are for decorative surfaces (such as table tops and walls), airplane bodies, tubes and rods, spindles, gears and the like.

As many changes could be made in the above structure and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention, what I claim as new and desire to secure by Letters Patent of the United States is:

1. The method of assembling a laminated structure which comprises transversely perforating a series of laminations, applying resin thereto, threading filaments of substantial tensile strength transversely through registering perforations of the several laminations, shifting alternate laminations transversely with respect to the intervening laminations to stagger the perforations and displace the filaments in zigzag relation for longitudinal spans along the laminations between displaced perforations, and then setting the resin between the laminations about the filaments and within the filament traversed perforations.

2. The method of claim 1 in which the filaments are of metal wire.

3. The method of claim 1 in which the filaments are of wire mesh.

4. The method of claim 1 in which the filaments are of ribbon form.

5. The method of claim 1 in which the resin is phenol formaldehyde resin.

LOUIS A. GRUENWALD.

REFERENCES CITED

The following references are of record in the file of this patent:

UNITED STATES PATENTS

| Number | Name | Date |
|---|---|---|
| 509,180 | Parks | Nov. 21, 1893 |
| 619,998 | Saunders | Feb. 21, 1899 |
| 693,915 | Smith | Feb. 25, 1902 |
| 906,777 | Crooke | Dec. 15, 1908 |
| 1,063,736 | Roberts | June 3, 1913 |
| 1,348,259 | Wilber | Aug. 3, 1920 |
| 1,384,308 | De Giers | July 12, 1921 |
| 1,444,482 | Saunders | Feb. 6, 1923 |
| 1,573,344 | Munroe | Mar. 30, 1926 |
| 1,609,682 | Angebaud | Dec. 7, 1926 |
| 1,831,058 | Cumfer | Nov. 10, 1931 |
| 1,903,076 | Winkler | Mar. 28, 1933 |
| 1,986,954 | Abrams | Jan. 8, 1935 |
| 2,055,032 | Johnson | Sept. 22, 1936 |
| 2,133,108 | Muller | Oct. 11, 1938 |
| 2,159,300 | Tashjian | May 23, 1939 |
| 2,205,600 | Payzant | June 25, 1940 |
| 2,261,264 | Luty | Nov. 4, 1941 |

FOREIGN PATENTS

| Number | Country | Date |
|---|---|---|
| 172,330 | Germany | June 25, 1906 |
| 305,694 | Great Britain | Feb. 8, 1929 |
| 690,574 | France | June 23, 1930 |
| 377,565 | Great Britain | July 28, 1932 |
| 162,627 | Switzerland | Sept. 16, 1933 |
| 193,552 | Switzerland | Jan. 3, 1938 |
| 504,423 | Great Britain | Apr. 25, 1939 |